(12) United States Patent
Seo et al.

(10) Patent No.: US 11,644,864 B2
(45) Date of Patent: May 9, 2023

(54) DISPLAY DEVICE

(71) Applicant: Samsung Display Co., LTD., Yongin-si (KR)

(72) Inventors: Tae An Seo, Hwaseong-si (KR); Jung Hun Lee, Hwaseong-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

(21) Appl. No.: 17/391,530

(22) Filed: Aug. 2, 2021

(65) Prior Publication Data

US 2022/0043480 A1 Feb. 10, 2022

(51) Int. Cl.
*G06F 1/16* (2006.01)
*G09F 9/30* (2006.01)

(52) U.S. Cl.
CPC .......... *G06F 1/1616* (2013.01); *G06F 1/1652* (2013.01); *G06F 1/1681* (2013.01); *G09F 9/301* (2013.01)

(58) Field of Classification Search
CPC .... G06F 1/1616; G06F 1/1652; G06F 1/1681; G06F 1/1618; G06F 2203/04102; G09F 9/301

See application file for complete search history.

(56) References Cited

U.S. PATENT DOCUMENTS

| | | | | |
|---|---|---|---|---|
| 10,151,424 B2* | 12/2018 | Hong | .................... | G06F 1/1601 |
| 10,198,237 B2* | 2/2019 | Feng | .................... | G09G 3/3208 |
| 2007/0279315 A1* | 12/2007 | Laves | .................... | G06F 1/1677 |
| | | | | 345/1.1 |
| 2014/0375530 A1* | 12/2014 | Delaporte | ............. | G06F 1/1652 |
| | | | | 345/1.3 |
| 2015/0241978 A1* | 8/2015 | Lombardi | ............. | G06F 1/1616 |
| | | | | 345/156 |
| 2016/0198579 A1* | 7/2016 | Hong | .................... | G06F 1/1601 |
| | | | | 248/346.01 |

(Continued)

FOREIGN PATENT DOCUMENTS

| | | |
|---|---|---|
| EP | 3 683 652 | 7/2020 |
| KR | 10-2018-0098504 | 9/2018 |
| KR | 10-2020-0079956 | 7/2020 |

OTHER PUBLICATIONS

English language translation of KR-20200079956-A, (Year: 2020).*
Extended European search report for European Patent Application or Patent No. 21189222.9 dated Dec. 22, 2021.

*Primary Examiner* — Anthony M Haughton
*Assistant Examiner* — Theron S Milliser
(74) *Attorney, Agent, or Firm* — Kile Park Reed & Houtteman PLLC

(57) ABSTRACT

A display device comprises a display module including a first folding area extending in a first direction, a first non-folding area located on a first side of the first folding area in a second direction intersecting the first direction, a second non-folding area located on a second side of the first folding area in the second direction, a second folding area extending in the second direction, a third non-folding area located on a first side of the second folding area in the first direction, and a fourth non-folding area located on a second side of the second folding area in the first direction, wherein the display module includes a first surface and a second surface opposite to the first surface, the first surface being a display surface.

20 Claims, 19 Drawing Sheets

(56) References Cited

U.S. PATENT DOCUMENTS

| 2017/0038799 A1* | 2/2017 | Delaporte | G06F 1/1616 |
| 2018/0039467 A1* | 2/2018 | Feng | G09G 3/3208 |
| 2020/0142447 A1 | 5/2020 | Yoon et al. | |

* cited by examiner

DISPLAY DEVICE

CROSS-REFERENCE TO RELATED APPLICATION

This application claims priority to and the benefit of Korean Patent Application No. 10-2020-0097883 under 35 U.S.C. § 119, filed in the Korean Intellectual Property Office (KIPO) on Aug. 5, 2020, the entire contents of which are incorporated herein by reference.

BACKGROUND

1. Technical Field

The disclosure relates to a display device, and more specifically, to a display device capable of switching a state between a folded state and an unfolded state.

2. Description of the Related Art

A display device displays an image. The market share of display devices having the same or a smaller volume or thickness and a larger display screen than those of the conventional display devices has increased. Further, a flexible display device such as a foldable display device or a bendable display device has been developed, which has a structure that can be folded and unfolded to provide a larger screen when desired.

The foldable display devices may include, on the basis of a display screen, an in-foldable display device in which the display screen is folded inward, and an out-foldable display device in which the display screen is folded outward.

A foldable display device may be an in-foldable display device or an out-foldable display device, but is not limited thereto, and may be an in/out-foldable display device capable of both in-folding and out-folding.

SUMMARY

Aspects of the disclosure provide an in/out-foldable display device capable of both in-folding and out-folding.

However, aspects of the disclosure are not restricted to the one set forth herein. The above and other aspects of the disclosure will become more apparent to one of ordinary skill in the art to which the disclosure pertains by referencing the detailed description of the disclosure given below.

According to an embodiment, a display device may include a display module including a first folding area extending in a first direction, a first non-folding area located on a first side of the first folding area in a second direction intersecting the first direction, a second non-folding area located on a second side of the first folding area in the second direction, a second folding area extending in the second direction, a third non-folding area located on a first side of the second folding area in the first direction, and a fourth non-folding area located on a second side of the second folding area in the first direction, wherein the display module may include a first surface and a second surface opposite to the first surface, the first surface being a display surface, and in an out-folding operation state, the display device is folded with respect to the second folding area such that the second surface in the third non-folding area and the second surface in the fourth non-folding area face each other.

The display device may further include a metal plate disposed on the second surface of the display module.

In an in-folding operation state, the display device may be folded with respect to the first folding area such that the first surface in the first non-folding area and the first surface in the second non-folding area face each other.

The metal plate may include a first metal plate disposed in an overlapping manner in the first non-folding area and the third non-folding area; a second metal plate disposed in an overlapping manner in the second non-folding area and the third non-folding area; a third metal plate disposed in an overlapping manner in the first non-folding area and the fourth non-folding area; and a fourth metal plate disposed in an overlapping manner in the second non-folding area and the fourth non-folding area. Each of the first metal plate to the fourth metal plate may have a whole pattern.

The metal plate may include a fifth metal plate disposed in the second folding area and disposed between the third non-folding area and the fourth non-folding area in the first non-folding area; and a sixth metal plate disposed between the third non-folding area and the fourth non-folding area in the second non-folding area.

Each of the fifth metal plate and the sixth metal plate may include a plurality of first patterns extending in the second direction and arranged in the first direction.

Each of the fifth metal plate and the sixth metal plate may not be disposed in the first folding area.

The metal plate may include a seventh metal plate disposed in an intersection region of the first folding area and the second folding area, the seventh metal plate may include a plurality of second patterns separated from the first to sixth metal plates adjacent thereto.

The metal plate may include a seventh metal plate disposed in a portion of the first folding area which does not overlap the second folding area, the seventh metal plate including a plurality of third patterns.

The display device may further include a main plate disposed under the metal plate. The main plate may include a first main plate disposed in an overlapping manner in the first non-folding area and the third non-folding area; a second main plate disposed in an overlapping manner in the second non-folding area and the third non-folding area; a third main plate disposed in an overlapping manner in the first non-folding area and the fourth non-folding area; and a fourth main plate disposed in an overlapping manner in the second non-folding area and the fourth non-folding area.

The display device may further comprise a first gear unit disposed in a portion of the second folding area which does not overlap the first folding area. The first gear unit may include an extension part extending in the second direction, and at least one joint part extending in the first direction from the extension part.

The at least one joint part may include a plurality of joint parts, and the plurality of joint parts may be disposed in the main plate and overlaps the main plate.

An overlap length of the main plate and the at least one joint part in an unfolded state of the display device may be greater than an overlap length of the main plate and the at least one joint part in the out-folding operation state of the display device.

The display device may further comprise a second gear unit disposed along the first folding area. The second gear unit may be used to perform an in-folding operation of the display device.

The first gear unit may be used to perform an out-folding operation of the display device.

According to another embodiment, a display device capable of an in-folding operation and an out-folding operation may comprise a display module including a first folding area extending in a first direction, a first non-folding area located on a first side of the first folding area in a second direction crossing the first direction, a second non-folding area located on a second side of the first folding area in the second direction, a second folding area extending in the second direction, a third non-folding area located on a first side of the second folding area in the first direction, and a fourth non-folding area located on a second side of the second folding area in the first direction, and a first surface and a second surface opposite to the first surface, the first surface being a display surface; and a metal plate disposed on the second surface of the display module. One of the first folding area and the second folding area is a folding area for the in-folding operation, and the other one of the first folding aera and the second folding area is a folding area for the out-folding operation. The metal plate is disposed in one of the first folding area and the second folding area and is not disposed in the other one of the first folding area and the second folding area.

The first folding area may be a folding area for the in-folding operation, the second folding area may be a folding area for the out-folding operation, the first surface in each of the first and second non-folding areas may face each other with respect to the first folding area, and the second surface in each of the third and fourth non-folding areas faces each other with respect to the second folding area.

The metal plate may include a first metal plate disposed in the second folding area and disposed between the third non-folding area and the fourth non-folding area in the first non-folding area; and a second metal plate disposed between the third non-folding area and the fourth non-folding area in the second non-folding area. Each of the first and second metal plates may include a plurality of patterns extending in the second direction and arranged in the first direction.

The display device may further comprise a gear unit for the out-folding operation disposed in the second folding area. The gear unit for the out-folding operation may include an extension part extending in the second direction; and a joint part extending in the first direction from the extension part.

A cross-sectional shape of the joint part may include a circle having a predetermined curvature. The display device may be out-folded according to the curvature of the joint part.

According to the display device of the disclosure, both in-folding and out-folding are possible. Therefore, three-dimensional images can be displayed to a user in various ways.

The effects of the disclosure are not limited to the aforementioned effects, and various other effects are included in the specification.

BRIEF DESCRIPTION OF THE DRAWINGS

The above and other aspects and features of the disclosure will become more apparent by describing in detail some embodiments thereof with reference to the attached drawings, in which.

DETAILED DESCRIPTION OF THE EMBODIMENTS

Figure 1:
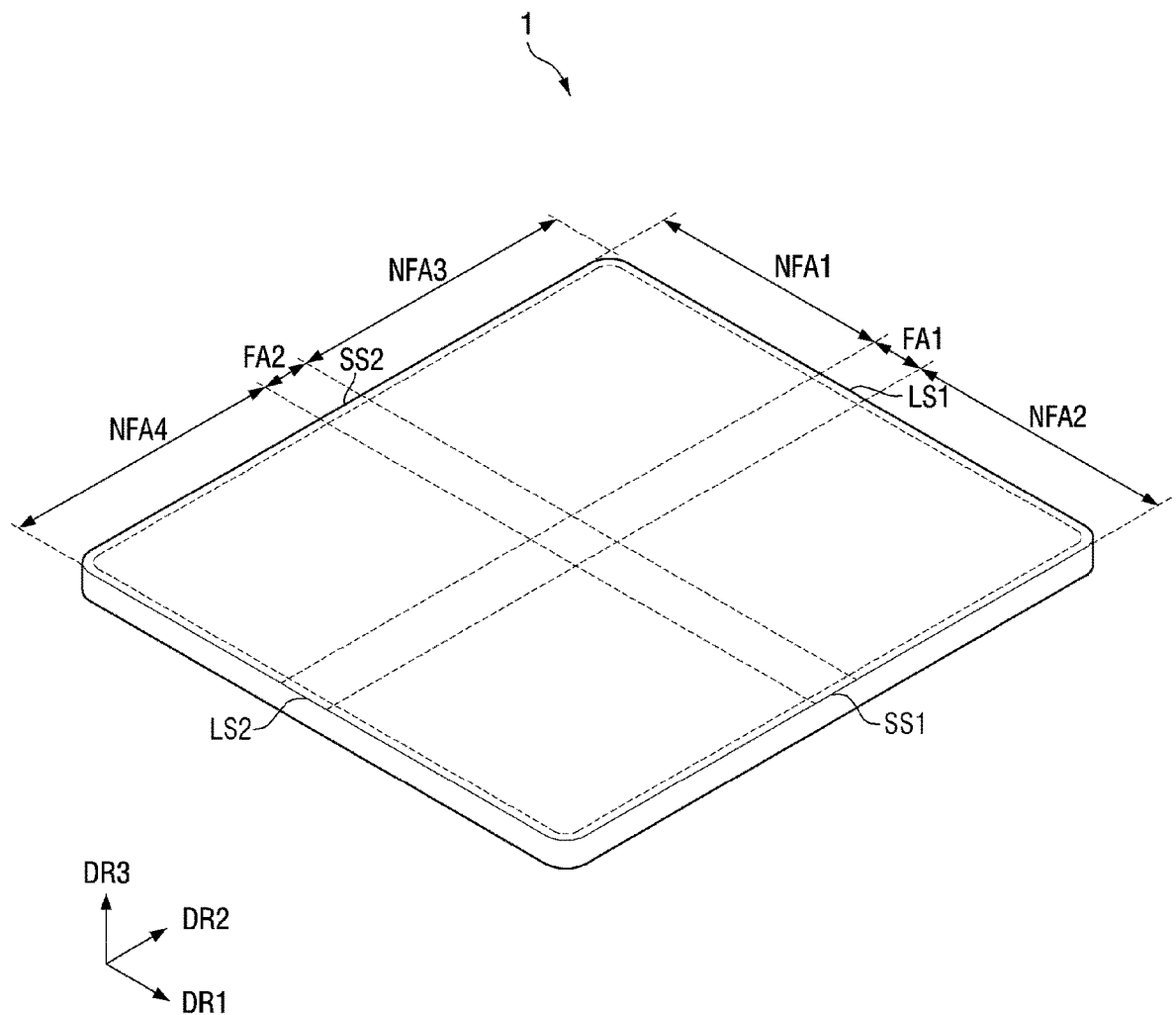
FIG. 1 is a schematic perspective view of a display device according to an embodiment.

Specific structural and functional descriptions of embodiments of the disclosure disclosed herein are only for illustrative purposes of the embodiments of the disclosure. The disclosure may be embodied in many different forms without departing from the spirit and significant characteristics of the disclosure. Therefore, the embodiments of the disclosure are disclosed only for illustrative purposes and should not be construed as limiting the disclosure. For example, the claimed invention is defined by the scope of the claims.

It will be understood that when an element is referred to as being related to another element such as being "coupled" or "connected" to another element, it can be directly coupled or connected to the other element or intervening elements may be present therebetween. In contrast, it should be understood that when an element is referred to as being related to another element such as being "directly coupled" or "directly connected" to another element, there are no intervening elements present. Other expressions that explain the relationship between elements, such as "between," "directly between," "adjacent to," or "directly adjacent to," should be construed in the same way.

Throughout the specification, the same reference numerals will refer to the same or like parts.

It will be understood that, although the terms "first," "second," "third" and the like may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, "a," "an," "the," and "at least one" do not denote a limitation of quantity, and are intended to include the singular and plural, unless the context clearly indicates otherwise. For example, "an element" has the same meaning as "at least one element," unless the context clearly indicates otherwise. The term "at least one" is not to be construed as limiting "a" or "an." The term "or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the FIGS. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

The term "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined or implied herein, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and the disclosure, and will not be interpreted in an ideal or excessively formal sense unless clearly so defined herein.

In the specification and the claims, the phrase "at least one of" is intended to include the meaning of "at least one selected from the group of" for the purpose of its meaning and interpretation. For example, "at least one of A and B" may be understood to mean "A, B, or A and B."

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as being limited to the particular shapes of regions as illustrated herein but are to include deviations in shapes that result, for example, from manufacturing. For example, a region illustrated or described as being flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described with reference to the attached drawings.

FIG. 1 is a schematic perspective view of a display device according to an embodiment.

Referring to FIG. 1, a display device 1 may be a foldable display device. The meanings of the term "foldable" may include bendable, rollable, and the like. Further, the term "foldable" should be interpreted as including "partially foldable," "entirely foldable," "in-foldable," and "out-foldable."

The display device 1 according to an embodiment may include an in-foldable display device and an out-foldable display device. In other words, the display device 1 may be a display device capable of in-folding (see "INFOLDING" of FIG. 2) to be in an in-folding operation state and of out-folding (see "OUTFOLDING" of FIG. 3) to be in an out-folding operation state. Here, the in-folding operation state may indicate an operation state in which the display device 1 is folded such that the display surfaces face each other, and the out-folding operation state may indicate an operation state in which the display device 1 is folded such that the display surface faces outward (such that the other surfaces opposite to the display surfaces face each other).

Hereinafter, for convenience of description, the in-folding operation state may be referred to as a first operation state, and the out-folding operation state may be referred to as a second operation state.

Hereinafter, in the embodiments, a first direction DR1, a second direction DR2, and a third direction DR3 may intersect each other in different directions. In the schematic perspective view of FIG. 1, for convenience of description, the horizontal direction, the vertical direction, and the thickness direction of the display device 1 may be respectively defined as the first direction DR1, the second direction DR2, and the third direction DR3. In the following embodiments, the first direction DR1 includes a rightward direction with respect to the display device 1 in perspective view and a leftward direction with respect to the display device 1 in perspective view. The second direction DR2 includes an upward direction with respect to the display device 1 in perspective view and a downward direction with respect to the display device 1 in perspective view. The third direction DR3 includes a direction toward the display surface from the other surface of the display device 1 and a direction toward the other surface from the display surface of the display device 1. It should be understood, however, that a direction mentioned in the embodiment refers to a relative direction and the embodiment is not limited to the direction mentioned.

The display device 1 may have a rectangular shape in a plan view. For example, the display device 1 may include long sides LS1 and LS2 extending in the first direction DR1 and short sides SS1 and SS2 extending in the second direction DR2 in a plan view. The first long side LS1 of the display device 1 may be located at one side of the display device 1 in the second direction DR2, and the second long side LS2 thereof may be located at the other side of the display device 1 in the second direction DR2. The first short side SS1 of the display device 1 may be located at one side of the display device 1 in the first direction DR1, and the second short side SS2 thereof may be located at the other side of the display device 1 in the first direction DR1.

As described above, the display device 1 may be a foldable display device capable of in-folding or out-folding to be in the first operation state or the second operation state, respectively. The display device 1 may be in the first operation state or the second operation state with respect to a folding area defined in the display device 1.

A first folding area FA1 for the first operation state and a second folding area FA2 for the second operation state may be defined in the display device 1.

The first folding area FA1 may extend in the second direction DR2, and the second folding area FA2 may extend in the first direction DR1. The first folding area FA1 may be formed to traverse an area from the first long side LS1 to the second long side LS2 of the display device 1, and the second folding area FA2 may be formed to traverse an area from the first short side SS1 to the second short side SS2 of the display device 1.

The first folding area FA1 and the second folding area FA2 may intersect each other. In other words, the first folding area FA1 and the second folding area FA2 may be disposed to overlap each other at the intersection. The first folding area FA1 and the second folding area FA2 may not overlap each other outside the intersection of the first folding area FA1 and the second folding area FA2.

The first folding area FA1 may be located between the center portions of the first and second long sides LS1 and LS2 of the display device 1. Non-folding areas NFA1 and NFA2 may be further defined in the display device 1 with respect to the first folding area FA1 located between the center portions of the first and second long sides LS1 and LS2 of the display device 1. For example, the first non-folding area NFA1 may be located on the other side of the first folding area FA1 in the first direction DR1 and the second non-folding area NFA2 may be located on one side of the first folding area FA1 in the first direction DR1.

Similarly, the second folding area FA2 may be located between the center portions of the first and second short sides SS1 and SS2 of the display device 1. Non-folding areas NFA3 and NFA4 may be further defined in the display device 1 with respect to the second folding area FA2 located between the center portions of the first and second short sides SS1 and SS2 of the display device 1. For example, the third non-folding area NFA3 may be located on one side of the second folding area FA2 in the second direction DR2, and the fourth non-folding area NFA4 may be located on the other side of the second folding area FA2 in the second direction DR2.

The first non-folding area NFA1 may be disposed to overlap the third non-folding area NFA3, the fourth non-folding area NFA4, and the second folding area FA2 positioned on the other side of the first folding area FA1 in the first direction DR1, and the second non-folding area NFA2 may be disposed to overlap the third non-folding area NFA3, the fourth non-folding area NFA4, and the second folding area FA2 positioned on one side of the first folding area FA1 in the first direction DR1.

Similarly, the third non-folding area NFA3 may be disposed to overlap the first non-folding area NFA1, the second non-folding area NFA2, and the first folding area FA1 positioned on one side of the second folding area FA2 in the second direction DR2, and the fourth non-folding area NFA4 may be disposed to overlap the first non-folding area NFA1, the second non-folding area NFA2, and the first folding area FA1 positioned on the other side of the second folding area FA2 in the second direction DR2.

The display device 1 may include a display module 100 (see FIG. 4), as will be described below. The display module 100 may include a display surface that displays an image and the other surface that is opposite to the display surface. The display surface and the other surface of the display module 100 may be opposite to each other. In the first operation state of the display device 1, the display device 1 may be folded such that the display surfaces of the display module 100 face each other, and in the second operation state, the display device 1 may be folded such that the other surfaces of the display module 100 face each other.

The first operation state and the second operation state of the display device 1 will be described in detail with reference to FIGS. 2 and 3.

Figure 2:
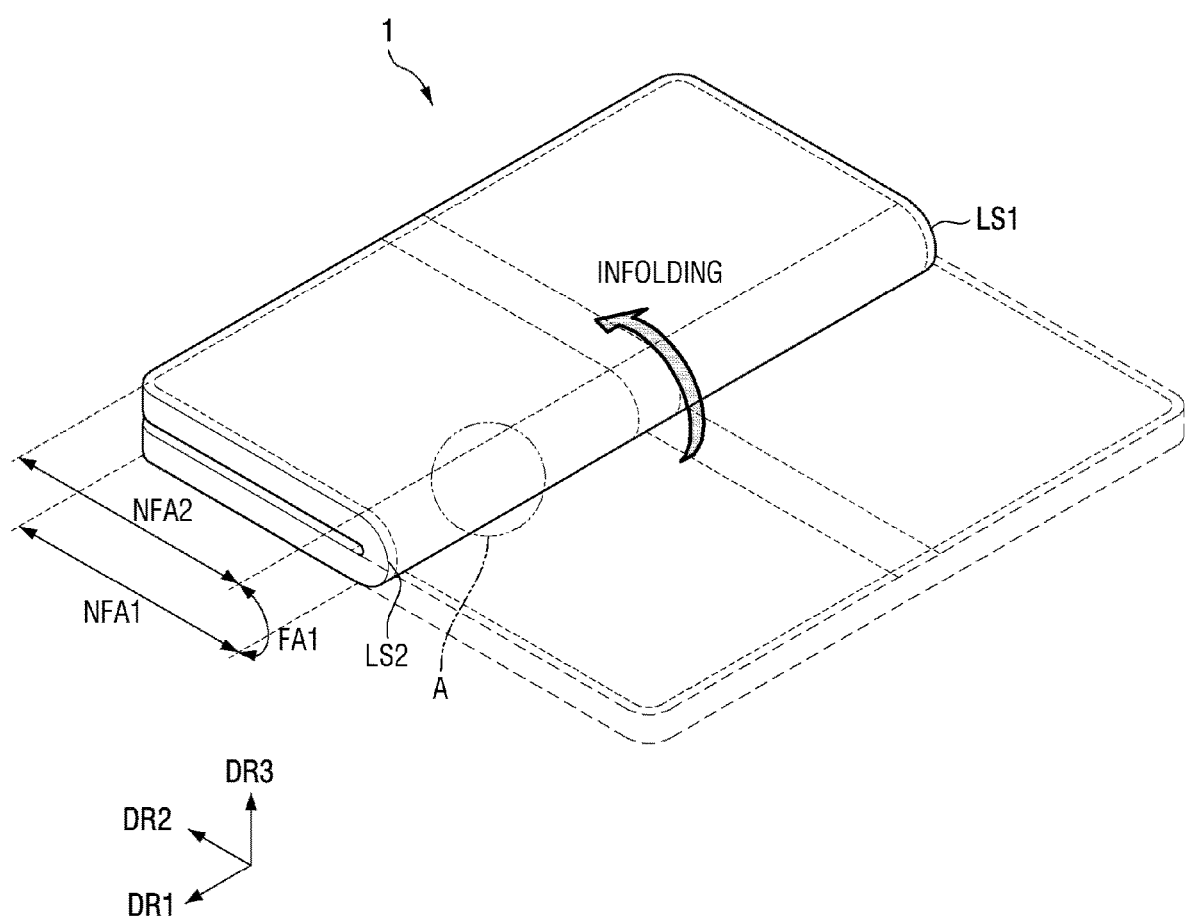
FIG. 2 is a schematic perspective view illustrating a first operation state of a display device according to an embodiment.

FIG. 2 is a schematic perspective view illustrating a first operation state of a display device according to an embodiment. FIG. 3 is a schematic perspective view illustrating a second operation state of a display device according to an embodiment.

Figure 3:
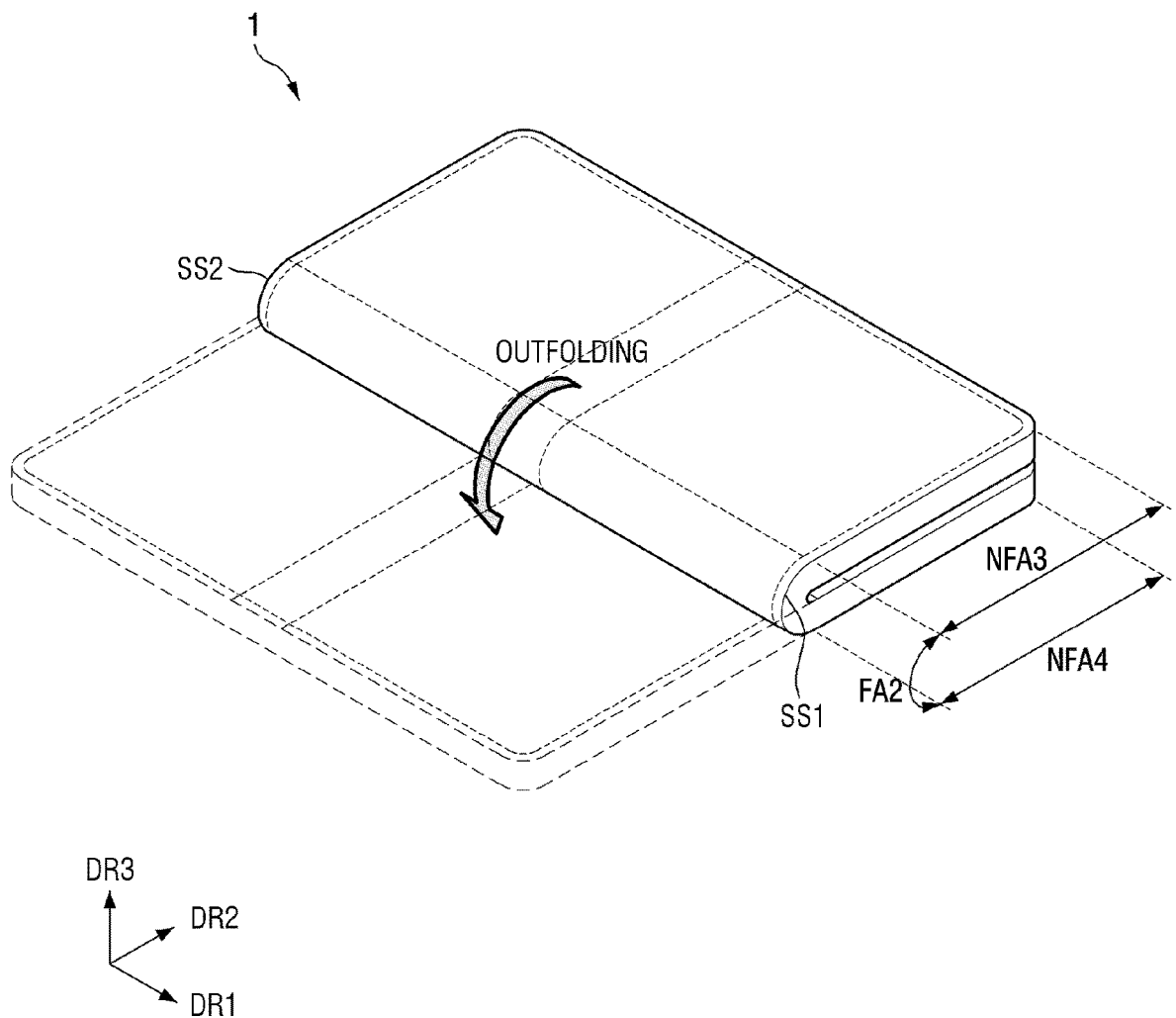
FIG. 3 is a schematic perspective view illustrating a second operation state of a display device according to an embodiment.

Referring to FIGS. 2 and 3, as described above with reference to FIG. 1, in the first operation state of the display device 1, the display device 1 may be folded such that the display surfaces of the display module 100 face each other, and in the second operation state, the display device 1 may be folded such that the other surfaces of the display module 100 face each other.

Specifically, in the first operation state of the display device 1, the display device 1 may be folded with respect to the first folding area FA1 such that the display surfaces of the first non-folding area NFA1 and the second non-folding area NFA2 face each other.

In the second operation state of the display device 1, the display device 1 may be folded with respect to the second folding area FA2 such that the other surfaces of the third non-folding area NFA3 and the fourth non-folding area NFA4 face each other.

The first operation state and the second operation state of the display device 1 may be achieved through a gear unit provided in each of the first and second folding areas FA1 and FA2 of the display device 1. A more detailed description will be given with reference to FIG. 4.

Figure 4:
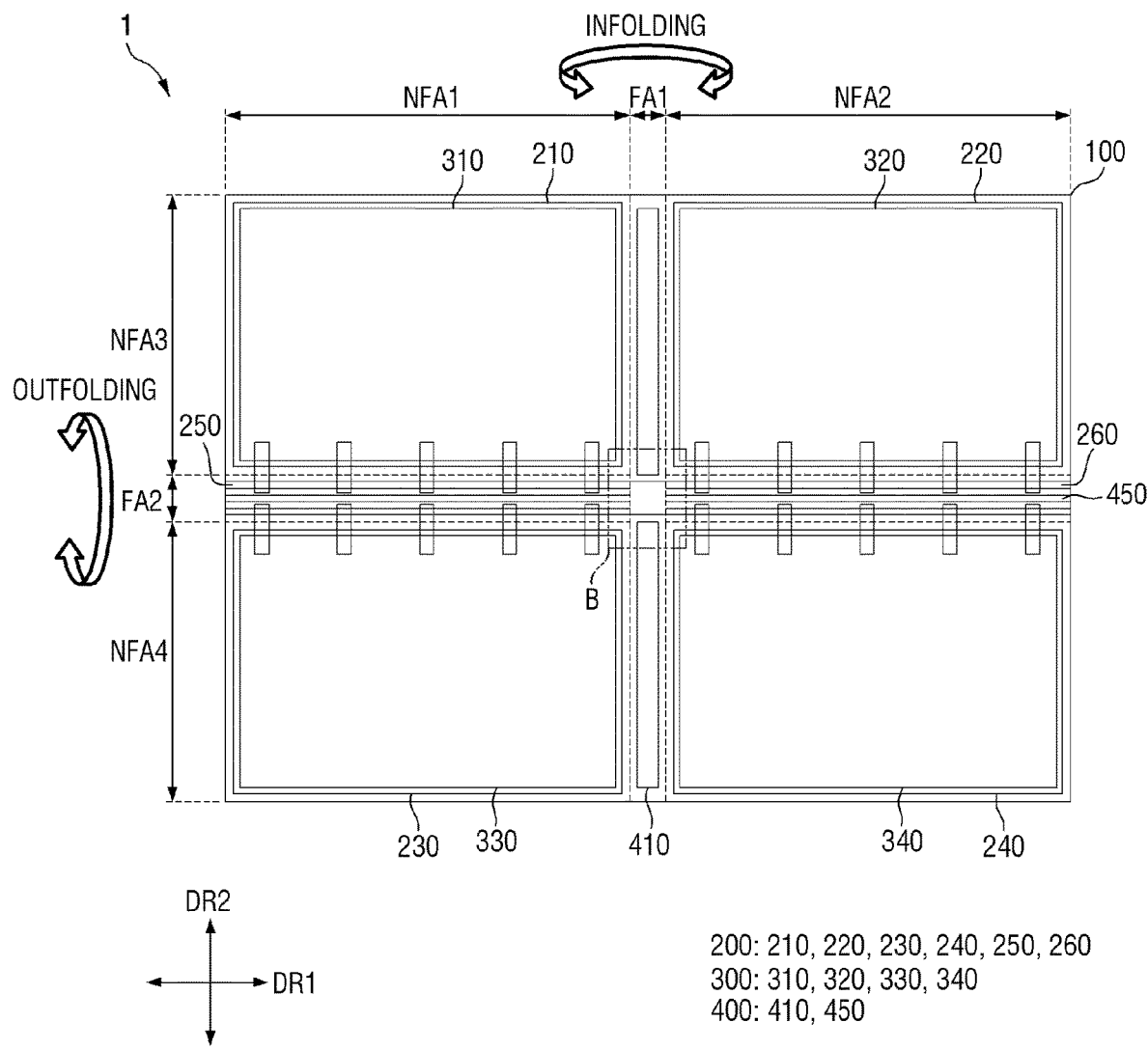
FIG. 4 is a schematic plan view of a display device according to an embodiment.

FIG. 4 is a schematic plan view of a display device according to an embodiment.

Referring to FIG. 4, as described above, the display device 1 may include a display module 100.

The display module 100 may have a shape similar to that of the display device 1 described above. The display module 100 may include a display panel. The display panel may be an organic light emitting display panel, a liquid crystal display panel, a plasma display panel, an electrophoretic display panel, an electrowetting display panel, a quantum dot light emitting display panel, a micro light emitting diode (LED) display panel, a nano LED display panel, or the like. In the illustrated embodiment, an organic light emitting display panel may be used as the display panel.

The display panel may include a flexible substrate including a flexible polymer material such as polyimide (PI). Accordingly, the display panel 100 may be curved, bent, folded, or rolled. The display panel may include pixels. The pixels of the display panel may be located in the center portion of the display panel. The display panel may further include driving circuits or signal lines for applying signals to the pixels. The signal lines and driving circuits may be located in the edge portion of the display panel.

The pixel may include a light emitting layer and a circuit layer for controlling the amount of light emitted from the light emitting layer. The circuit layer may include wirings, electrodes, and at least one transistor. In an embodiment, the light emitting layer may include an organic light emitting material. The light emitting layer may be sealed by an encapsulation layer. The encapsulation layer may seal the light emitting layer to prevent moisture or the like from infiltrating from the outside. The encapsulation layer may be a single or multilayer inorganic film, or a laminated film formed by alternately laminating inorganic and organic films Although not shown, a window may be further disposed on the display module 100 to protect the display module 100. The window may be disposed to overlap the display panel in the thickness direction. The window and the display panel may have substantially the same size in a plan view.

The window may be made of glass, quartz, or the like. The window may have a thickness less than about 100 gm. In some embodiments, the window may include ultra-thin glass (UTG). In some embodiments, the window may include a flexible material.

The display module 100 may be disposed over the first and second folding areas FA1 and FA2 and the first to fourth non-folding areas NFA1 to NFA4.

The display device 1 may further include a metal plate 200 disposed below the display module 100.

The metal plate 200 may prevent the display module 100 from being bent or may reduce the degree to which the display module 100 is bent (e.g., bending angle, or bending curvature radius) by an external force. For example, the metal plate 200 may maintain the display module 100 in a relatively flat state even in case that an external force is applied thereto.

The metal plate 200 may include a rigid or semi-rigid material. Specifically, the metal plate 200 may include a metal material such as stainless steel (SUS) and aluminum, or a polymer such as polymethyl methacrylate (PMMA), polycarbonate (PC), polyvinyl alcohol (PVA), acrylonitirle-butadiene-styrene (ABS), polyethylene terephthalate (PET), or the like. For example, the metal plate 200 may be a stainless steel film having a thickness of about 150 gm to about 200 gm. As another example, the metal plate 200 may be an aluminum film having a thickness of about 150 gm to about 200 µm.

The metal plate 200 may include first to sixth metal plates 210, 220, 230, 240, 250, and 260. The first metal plate 210 may be disposed in a region where the first non-folding area NFA1 and the third non-folding area NFA3 overlap each other, the second metal plate 220 may be disposed in a region where the second non-folding area NFA2 and the third non-folding area NFA3 overlap each other, the third metal plate 230 may be disposed in a region where the first non-folding area NFA1 and the fourth non-folding area NFA4 overlap each other, and the fourth metal plate 240 may be disposed in a region where the second non-folding area NFA2 and the fourth non-folding area NFA4 overlap each other. Further, the fifth metal plate 250 may be disposed in a region of the second folding area FA2, which overlaps the first non-folding area NFA1, and the sixth metal plate 260 may be disposed in a region of the second folding area FA2, which overlaps the second non-folding area NFA2. The fifth metal plate 250 may be disposed between the first metal plate 210 and the third metal plate 230 in a plan view, and the sixth metal plate 260 may be disposed between the second metal plate 220 and the fourth metal plate 240 in a plan view.

Each of the first to fourth metal plates 210, 220, 230, and 240 may have a shape of a whole pattern.

The first metal plate 210 and the second metal plate 220 may be physically separated from each other, and the third metal plate 230 and the fourth metal plate 240 may be physically separated from each other.

On the other hand, each of the fifth metal plate 250 and the sixth metal plate 260 may include patterns extending in the first direction DR1. The respective patterns of the fifth metal plate 250 and the sixth metal plate 260 may be disposed to be spaced apart from each other in the second direction DR2.

The fifth metal plate 250 and the sixth metal plate 260 may be disposed to be spaced apart from each other while interposing therebetween a first gear unit 410 located in the first folding area FA1, which will be described below.

Each of the metal plates 210, 220, 230, and 240 of the display device 1 according to an embodiment may be formed as the whole pattern, thereby supporting the upper display module 100 in their positions. On the other hand, each of the fifth and sixth metal plates 250 and 260 of the display device 1 may be formed as the multiple patterns, and thus may more readily achieve the second operation state of the display device 1, as will be described below.

The metal plate 200 of the display device 1 according to an embodiment may not be provided in the first folding area FA1. Accordingly, in case that the display device 1 is switched from a non-folding state to the first operation state, it is possible to prevent stress caused by the metal plate 200.

The display device 1 according to an embodiment may further include a main plate 300 disposed under the metal plate 200.

A first main plate 310 may be disposed in a region where the first non-folding area NFA1 and the third non-folding area NFA3 overlap each other, a second main plate 320 may be disposed in a region where the second non-folding area NFA2 and the third non-folding area NFA3 overlap each other, a third main plate 330 may be disposed in a region where the first non-folding area NFA1 and the fourth non-folding area NFA4 overlap each other, and a fourth main plate 340 may be disposed in a region where the second non-folding area NFA2 and the fourth non-folding area NFA4 overlap each other.

The first to fourth main plates 310, 320, 330, and 340 may be physically spaced apart from each other.

As described above, the first operation state and the second operation state of the display device 1 may be achieved through the gear unit provided in each of the first and second folding areas FA1 and FA2 of the display device 1.

The display device 1 according to an embodiment may further include gear units 400 (including 410 and 450) disposed in the first and second folding areas FA1 and FA2, respectively. The first gear unit 410 may be disposed in the first folding area FA1, and the second gear unit 450 may be disposed in the second folding area FA2. The first gear unit 410 may extend in the second direction DR2, which is the extension direction of the first folding area FA1, and the second gear unit 450 may extend in the first direction DR1, which is the extension direction of the second folding area FA2.

The first gear unit 410 may be configured to switch the display device 1 from the non-folding state to the first operation state, and the second gear unit 450 may be configured to switch the display device 1 from the non-folding state to the second operation state.

A detailed configuration of each gear unit 410 or 450 will be described with reference to FIGS. 5 to 9.

Figure 5:
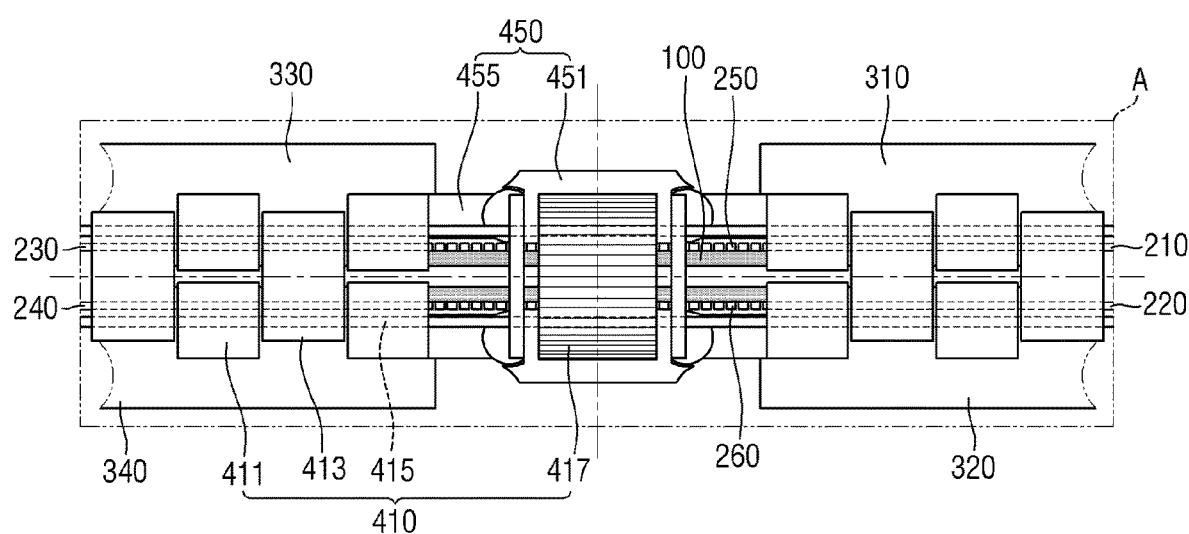
FIG. 5 is a schematic enlarged side view of area A of FIG. 2.
Figure 6:
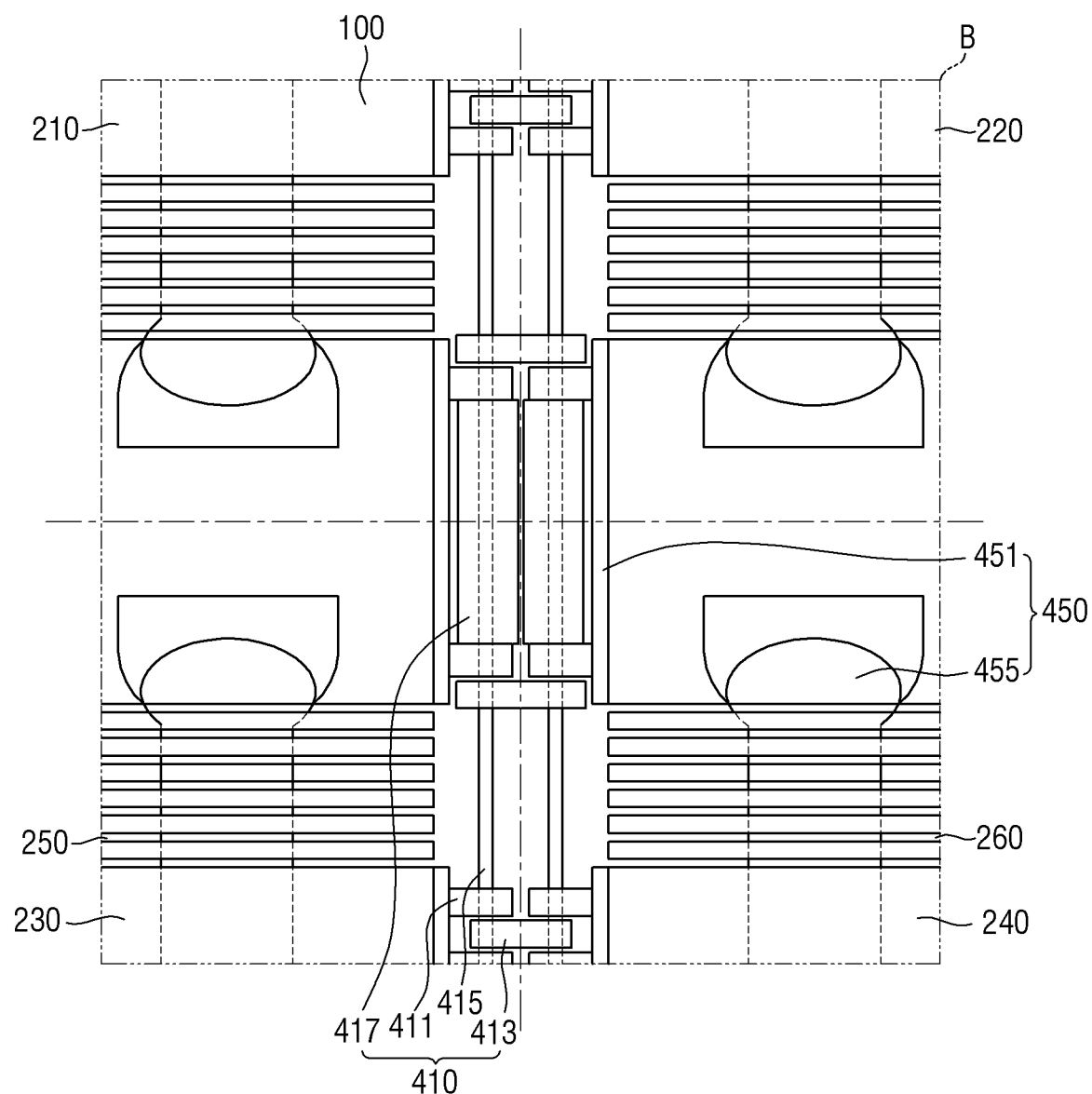
FIG. 6 is a schematic enlarged plan view of area B of FIG. 4.
Figure 7:
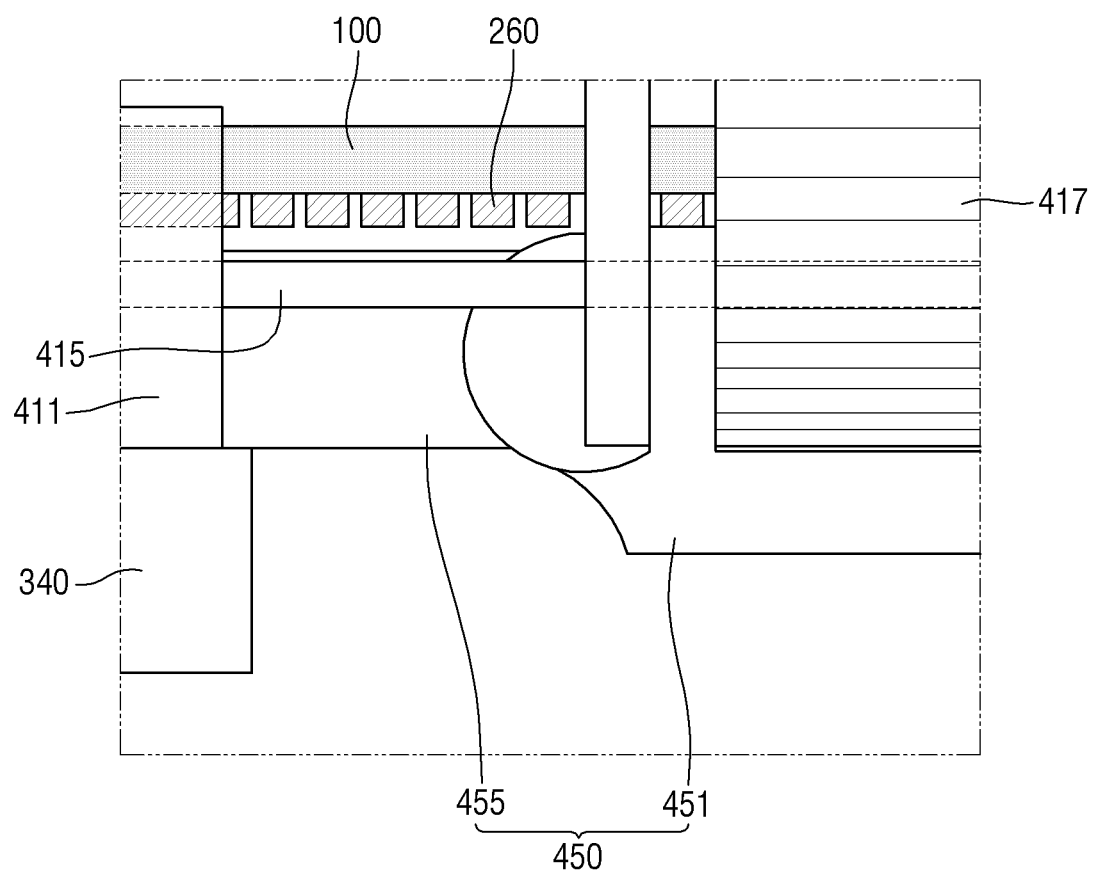
FIG. 7 is a schematic enlarged side view of the sixth metal plate and the display module of FIG. 5.

FIG. 5 is a schematic enlarged side view of area A of FIG. 2. FIG. 6 is a schematic enlarged plan view of area B of FIG. 4. FIG. 7 is a schematic enlarged side view of the sixth metal plate and the display module of FIG. 5.

Referring to FIGS. 5 to 7, the first gear unit 410 may include a first joint part 411, a connection part 413, a shaft 415, and a main gear 417.

Specifically, the first joint part 411 may be connected to the adjacent connection part 413. The first joint part 411 may include an upper joint part disposed to overlap the first and third metal plates 210 and 230 in a side view and a lower joint part disposed to overlap the second and fourth metal plates 220 and 240 in a side view. The upper and lower joint parts may be separated from each other in the thickness direction. Multiple first joint parts 411 may be provided. The connection part 413 may be disposed between the adjacent first joint parts 411. The connection part 413 may be connected with the adjacent first joint part 411. The connection parts 413 may be disposed to overlap the first to fourth metal plates 210, 220, 230, and 240 in a side view.

The shaft 415 may extend in the second direction DR2. Multiple shafts may be provided. The shafts 415 may be located below the sixth metal plate 260 and above the fifth metal plate 250 in a side view. The shaft 415 may pass through the first joint part 411 and the connection part 413. The shafts 415 may be located on the left and right sides of the main gear 417 and may extend to be connected to the main gear 417 in a side view.

Referring further to FIG. 4, the second gear unit 450 may include an extension part 451 extending in the first direction DR1, and second joint parts 455 branched from the extension part 451.

Referring further to FIG. 4, the second joint parts 455 may be disposed in the adjacent main plate 300 and overlap the adjacent main plate 300.

For example, the second joint parts 455 located above the second folding area FA2 and on the left side of the first folding area FA1 may be disposed in the first main plate 310 and overlap the first main plate 310, the second joint parts 455 located above the second folding area FA2 and on the right side of the first folding area FA1 may be disposed in the second main plate 320 and overlap the second main plate 320, the second joint parts 455 located under the second folding area FA2 and on the left side of the first folding area FA1 may be disposed in the third main plate 330 and overlap the third main plate 330, and the second joint parts 455 located under the second folding area FA2 and on the right side of the first folding area FA1 may be disposed in the fourth main plate 340 and overlap the fourth main plate 340.

FIG. 4 illustrates that the number of the second joint parts 455 overlapping each of the first to fourth main plates 310, 320, 330, and 340 is 5, but the number of the second joint parts 455 overlapping each of the first to fourth main plates 310, 320, 330, and 340 is not limited to 5 and may be less than or greater than 5.

The remaining components, which are illustrated in FIGS. 5 to 7 but are not described above, have been described with reference to FIGS. 1 to 4, and thus a repetitive description will be omitted.

Figure 8:
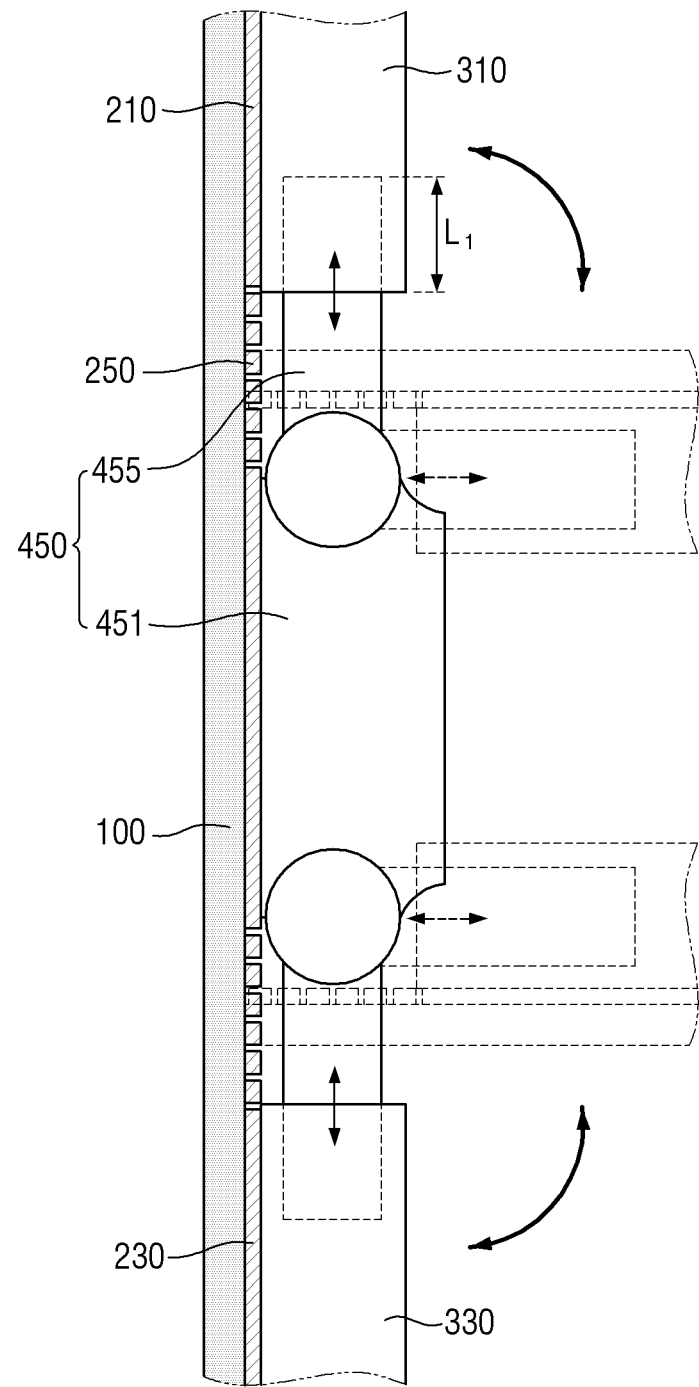
FIGS. 8 and 9 are schematic diagrams illustrating a second folding operation of a display device according to an embodiment.
Figure 9:
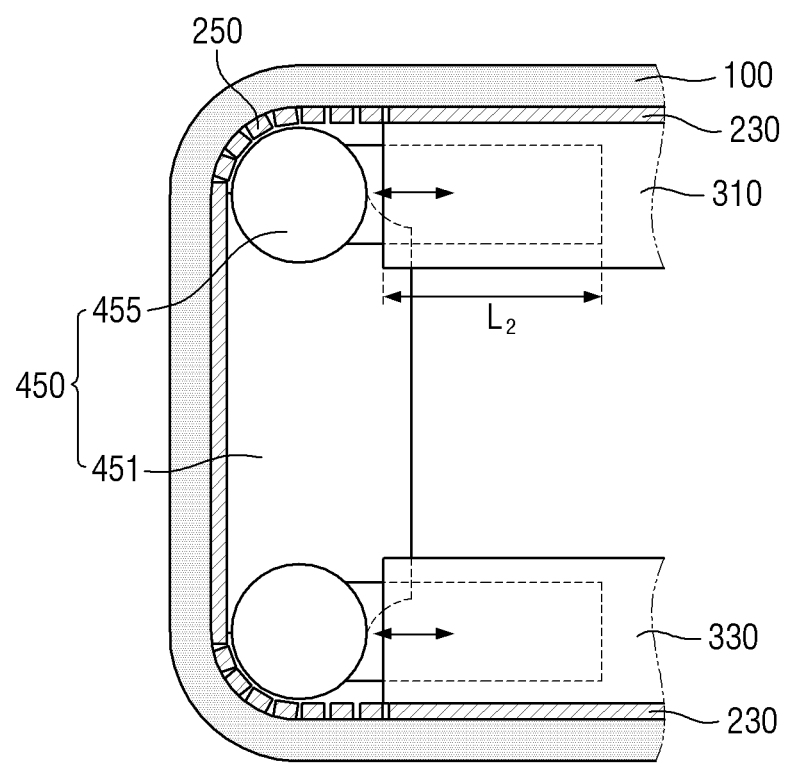

FIGS. 8 and 9 are schematic diagrams illustrating a second folding operation of a display device according to an embodiment.

Referring to FIGS. 8 and 9, as described above, the second joint parts 455 may be disposed in the adjacent main plate 300 and overlap the adjacent main plate 300.

For example, the second joint parts 455 located above the second folding area FA2 and on the left side of the first folding area FA1 may be disposed in the first main plate 310 and overlap the first main plate 310, the second joint parts 455 located above the second folding area FA2 and on the right side of the first folding area FA1 may be disposed in the second main plate 320 and overlap the second main plate 320, the second joint parts 455 located under the second folding area FA2 and on the left side of the first folding area FA1 may be disposed in the third main plate 330 and overlap the third main plate 330, and the second joint parts 455 located under the second folding area FA2 and on the right side of the first folding area FA1 may be disposed in the fourth main plate 340 and overlap the fourth main plate 340.

In the non-folding state of the display device 1, each of the first to fourth main plates 310, 320, 330, and 340 and the second joint part 455 may be disposed to overlap each other while having a first overlap length L1.

When the display module 100 switches to the second operation state, the other surface of the display module 100 may be subjected to compressive stress, and the display surface of the display module 100 may be subjected to tensile stress. If the compressive stress is applied to the other surface of the display module 100 when the display device 1 switches to the second operation state, the length of the other surface of the display module 100 adjacent to the second joint parts 455 may be shortened. If the second joint parts 455 are connected to the adjacent first and third main plates 310 and 330, the length of the other surface of the display module 100 may be maintained despite the tendency that the length of the other surface of the display module 100 becomes shortened. Therefore, waviness may occur on the other surface of the display module 100. This may be visually recognized by a user and cause a screen defect.

In order to prevent the waviness caused by the compressive stress applied to the other surface of the display module 100 when the display device 1 switches to the second operation state, it may be considered that the first and third main plates 310 and 330 and the second joint parts 455 are disconnected to allow the second joint parts 455 to be further moved into the first and third main plates 310 and 330.

In other words, when the display device 1 according to an embodiment switches to the second operation state, the first and third main plates 310 and 330 and the second joint parts 455 may be disconnected such that the second joint parts 455 are further moved into the first and third main plates 310 and 330, thereby preventing the waviness from occurring on the other surface of the display module 100.

As illustrated in FIG. 9, after the display device 1 switches to the second operation state, the first overlap length L1 of the second joint parts 455 and the first and third main plates 310 and 330 may increase to a second overlap length L2.

Further, as illustrated in FIGS. 8 and 9, a portion of the second joint part 455, which is connected to the extension part 451, may have a circular cross-sectional shape. The circular cross-sectional shape of the portion of the second joint part 455, which is connected to the extension part 451, may have a predetermined curvature. The display module 100 and the metal plate 200 may switch to the second operation state by the circular shape (having a predetermined curvature) of the portion of the second joint part 455 that is connected to the extension part 451.

As described above, each of the first to fourth metal plates 210, 220, 230, and 240 of the display device 1 according to an embodiment may be formed as the whole pattern, thereby supporting the upper display module 100 in their positions. On the other hand, each of the fifth and sixth metal plates 250 and 260 of the display device 1 may be formed as multiple patterns, and thus may serve to more readily achieve the second operation state of the display device 1.

Figure 10:
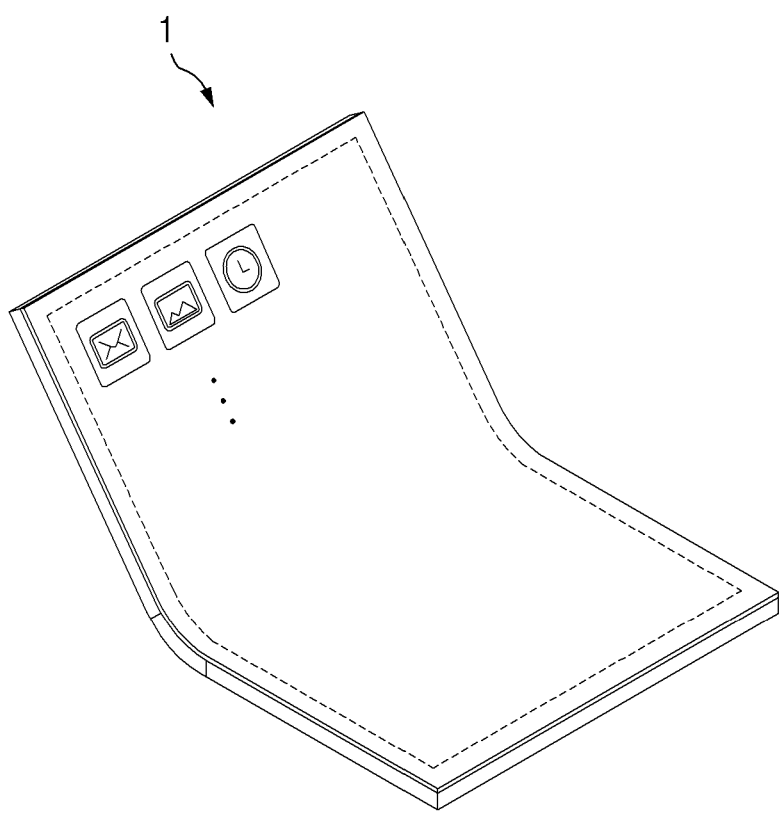
FIG. 10 is a schematic perspective view showing a first operation state of a display device according to an embodiment.

FIG. 10 is a schematic perspective view showing a first operation state of a display device according to an embodiment.

Referring to FIG. 10, since the display device 1 according to an embodiment is capable of switching from the non-folding state to the first operation state, the user can easily see the screen of the display device 1 by folding only the upper portion (e.g., the first non-folding area NFA1 of FIG. 1) of the display device 1 after placing the display device 1 in a non-folding state on an arbitrary support.

Figure 11:
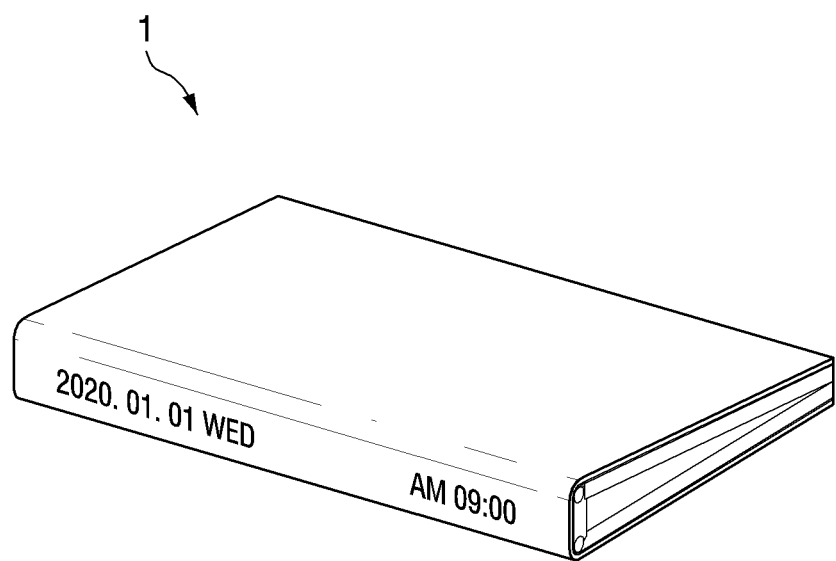
FIG. 11 is a schematic perspective view illustrating an example of a second operation state of a display device according to an embodiment.
Figure 12:
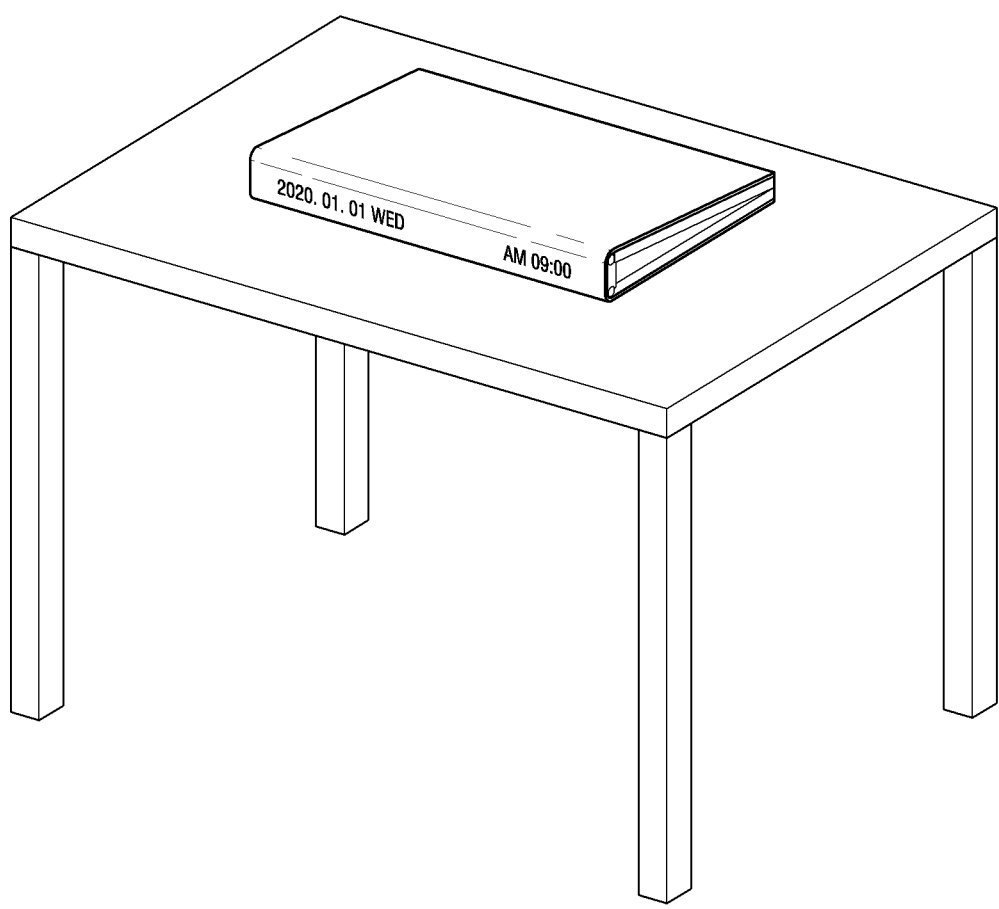
FIG. 12 is a schematic perspective view illustrating an example in which the display device of FIG. 11 is used.

FIG. 11 is a schematic perspective view illustrating an example of a second operation state of a display device according to an embodiment. FIG. 12 is a schematic perspective view illustrating an example in which the display device of FIG. 11 is used.

Referring to FIGS. 11 and 12, since the display device 1 according to an embodiment is capable of switching from the non-folding state to the second operation state, the user may see the image on an area including the folding area (e.g., second folding area FA2 of FIGS. 1 and 3) in the second operation state as well. As shown in FIG. 12, the user may see the image displayed in the folding area (e.g., the second folding area FA2) after placing the display device 1 in the second operation state on a support.

Figure 13:
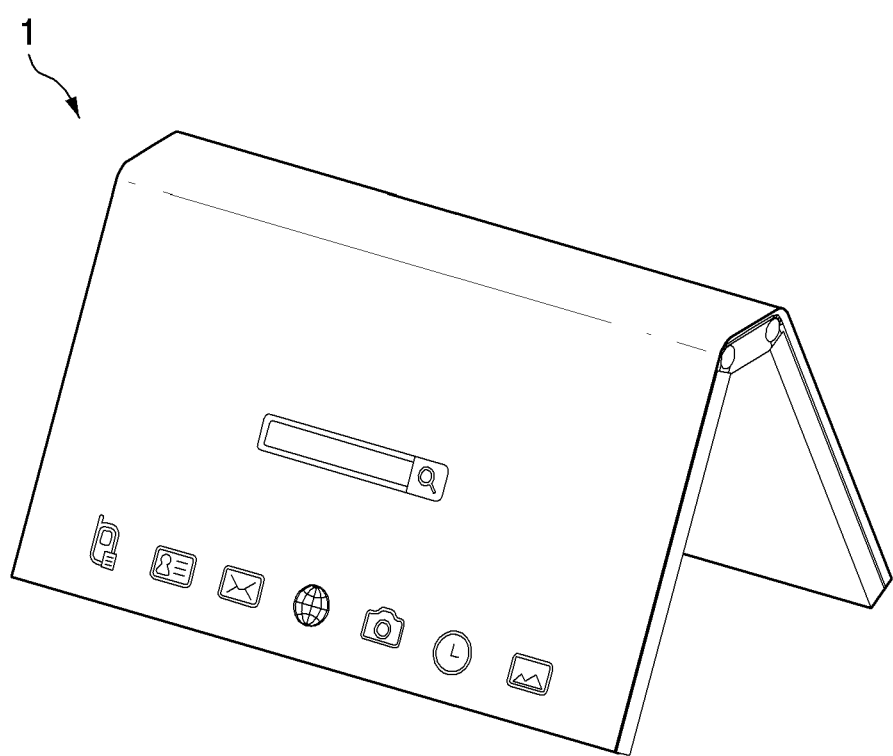
FIG. 13 is a schematic perspective view illustrating another example of a second operation state of a display device according to an embodiment.
Figure 14:
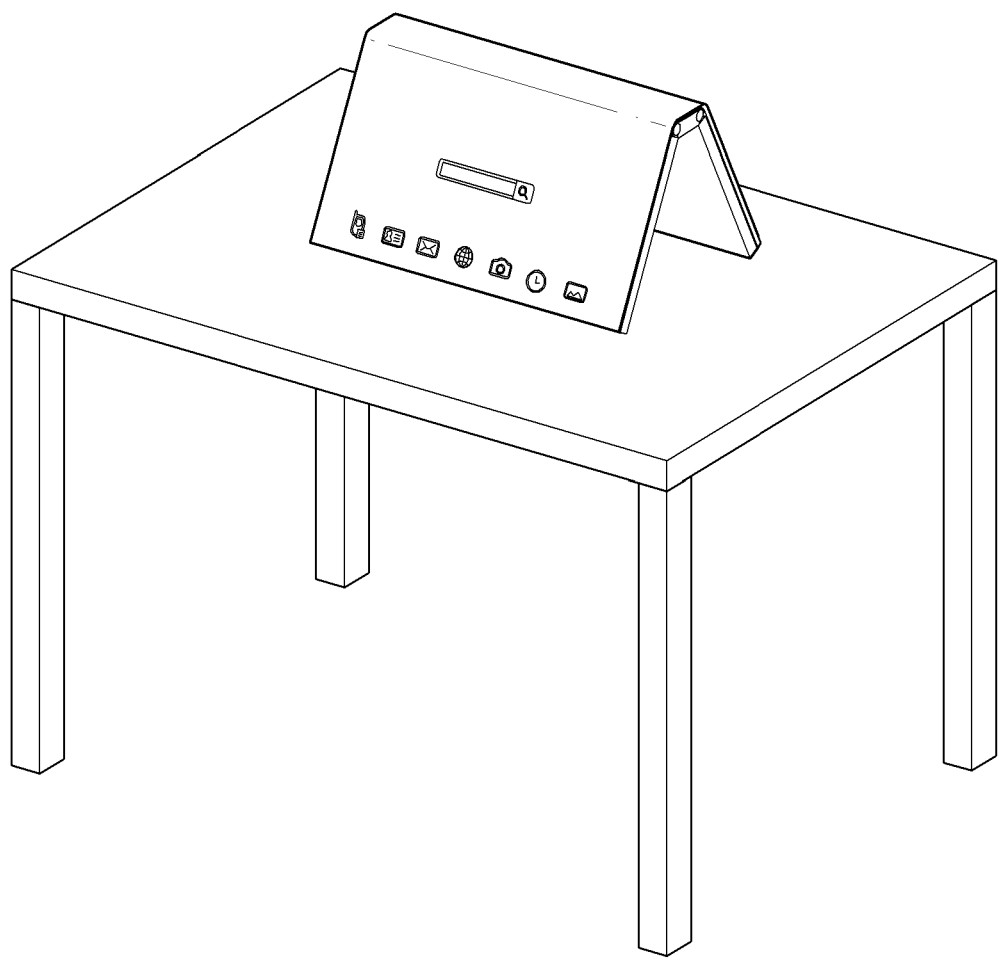
FIG. 14 is a schematic perspective view illustrating another example in which the display device of FIG. 13 is used.

FIG. 13 is a schematic perspective view illustrating another example of a second operation state of a display device according to an embodiment. FIG. 14 is a schematic perspective view illustrating another example in which the display device of FIG. 13 is used.

Referring to FIGS. 13 and 14, since the display device 1 according to an embodiment is capable of switching from the non-folding state to the second operation state, each of the non-folding areas (third and fourth non-folding areas NFA3 and NFA4 of FIGS. 1 and 3) may display an image.

Specifically, the display device 1 according to an embodiment is capable of switching from the non-folding state to the second operation state, so that an image may be displayed in each of the non-folding areas (e.g., the third and fourth non-folding areas NFA3 and NFA4 of FIGS. 1 and 3) and an arc shape may be formed by the non-folding areas and the folding area in a perspective view as shown in FIG. 13, thereby showing or sharing the screen with a third person sitting on the opposite side.

Hereinafter, other embodiments will be described. In the following embodiments, the same components as those of the above-described embodiment may be denoted by the same reference numerals, and a description thereof will be omitted or simplified.

Figure 15:
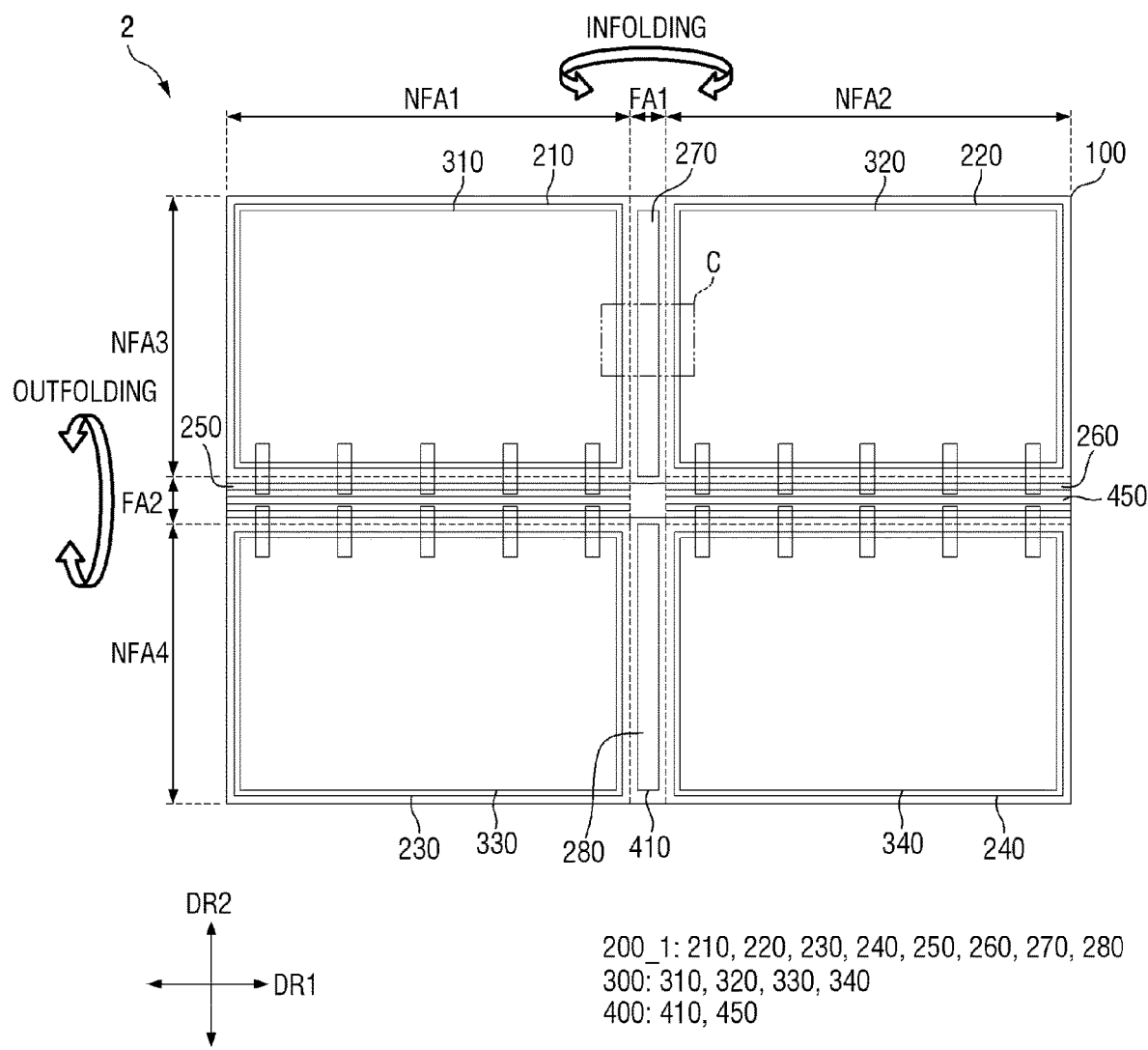
FIG. 15 is a schematic plan view of a display device according to another embodiment.
Figure 16:
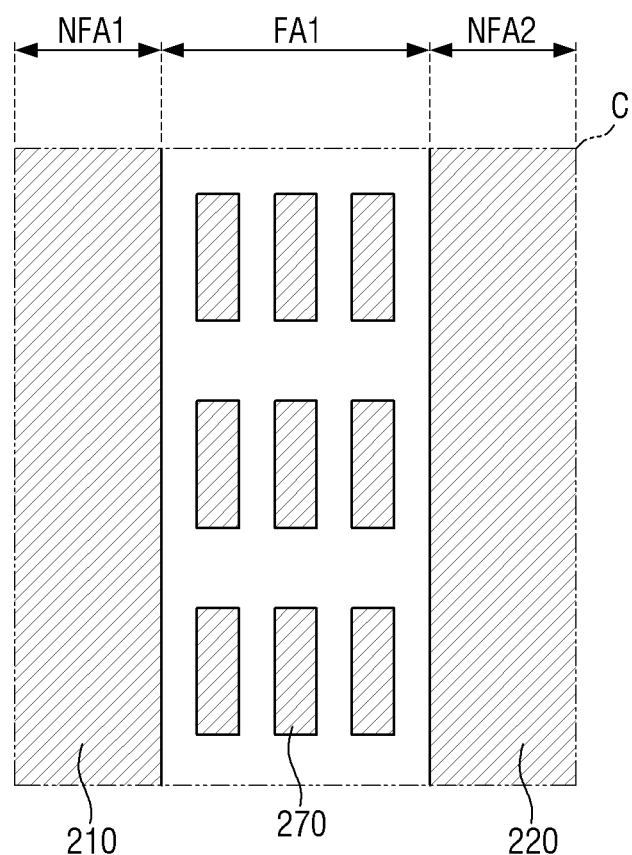
FIG. 16 is a schematic enlarged plan view of area C of FIG. 15.

FIG. 15 is a schematic plan view of a display device according to another embodiment. FIG. 16 is a schematic enlarged plan view of area C of FIG. 15.

Referring to FIGS. 15 and 16, a display device 2 according to the embodiment may be different from the display device 1 of FIGS. 1 to 9 at least in that a metal plate 200_1 of the display device 2 further includes seventh and eighth metal plates 270 and 280.

Specifically, the metal plate 200_1 of the display device 2 according to the embodiment may further include the seventh and eighth metal plates 270 and 280.

The seventh and eighth metal plates 270 and 280 may be disposed in the first folding area FA1. The seventh metal plate 270 may be disposed on one side of the second folding area FA2 in the second direction DR2, and the eighth metal plate 280 may be disposed on the other side of the second folding area FA2 in the second direction DR2.

As shown in FIG. 16, the seventh metal plate 270 may include patterns. The patterns of the seventh metal plate 270 may be disposed to be spaced apart from each other. The patterns of the seventh metal plate 270 may be arranged in a matrix in the first direction DR1 and the second direction DR2.

However, the disclosure is not limited thereto, and the patterns of the seventh metal plate 270 may be arranged in various ways.

The pattern arrangement method of the eighth metal plate 280 and the pattern arrangement method of the seventh metal plate 270 may be substantially the same or different.

The display device 2 according to the embodiment may further include the seventh and eighth metal plates 270 and 280, and the display module 100 may be more effectively supported in the first folding area FA1. Accordingly, it is possible to prevent sagging of the display module 100 in the first folding area FA1.

Even in this embodiment, when switching to the second operation state, the other surface of the display module 100 may be subjected to compressive stress, and the display surface of the display module 100 may be subjected to tensile stress. If the compressive stress is applied to the other surface of the display module 100 when the display device 2 switches to the second operation state, the length of the other surface of the display module 100 adjacent to the second joint parts 455 may tend to be shortened. If the second joint parts 455 are connected to the adjacent first and third main plates 310 and 330, the length of the other surface of the display module 100 may be maintained despite the tendency that the length of the other surface of the display module 100 becomes shortened. Therefore, waviness may occur on the other surface of the display module 100. This may be visually recognized by the user and may cause a screen defect.

In order to prevent the waviness caused by the compressive stress applied to the other surface of the display module 100 when the display device 2 switches to the second operation state, it may be considered that the first and third main plates 310 and 330 and the second joint parts 455 are disconnected to allow the second joint parts 455 to be further moved into the first and third main plates 310 and 330.

In other words, when the display device 2 according to an embodiment is switched to the second operation state, the first and third main plates 310 and 330 and the second joint parts 455 may be disconnected such that the second joint parts 455 are further moved into the first and third main plates 310 and 330, thereby preventing the waviness from occurring on the other surface of the display module 100.

Figure 17:
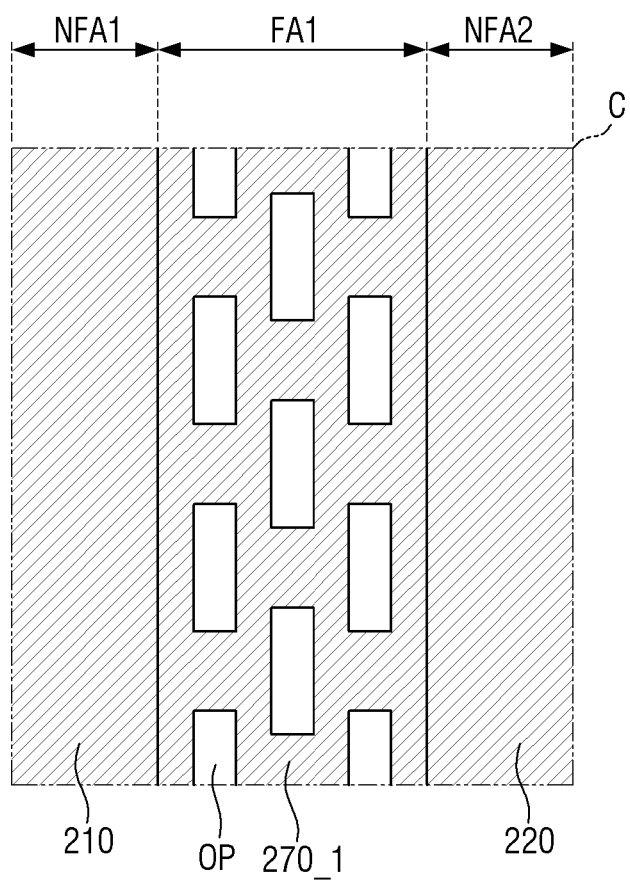
FIG. 17 is a schematic plan view showing a modified example of FIG. 16.

FIG. 17 is a schematic plan view showing a modified example of FIG. 16.

Referring to FIG. 17, a display device according to the embodiment may be different from the display device 2 of FIG. 16 at least in that a seventh metal plate 270_1 includes openings OP.

Specifically, the seventh metal plate 270_1 of the display device according to the embodiment may include the multiple openings OP.

The openings OP may include rows extending in the second direction DR2 as illustrated in FIG. 17. For example, the rows of the adjacent openings OP may be alternately disposed (or may be disposed in a zigzag manner).

The openings OP may completely penetrate the seventh metal plate 270_1 in the thickness direction. The material of the seventh metal plate 270_1 may completely surround the openings OP.

Figure 18:
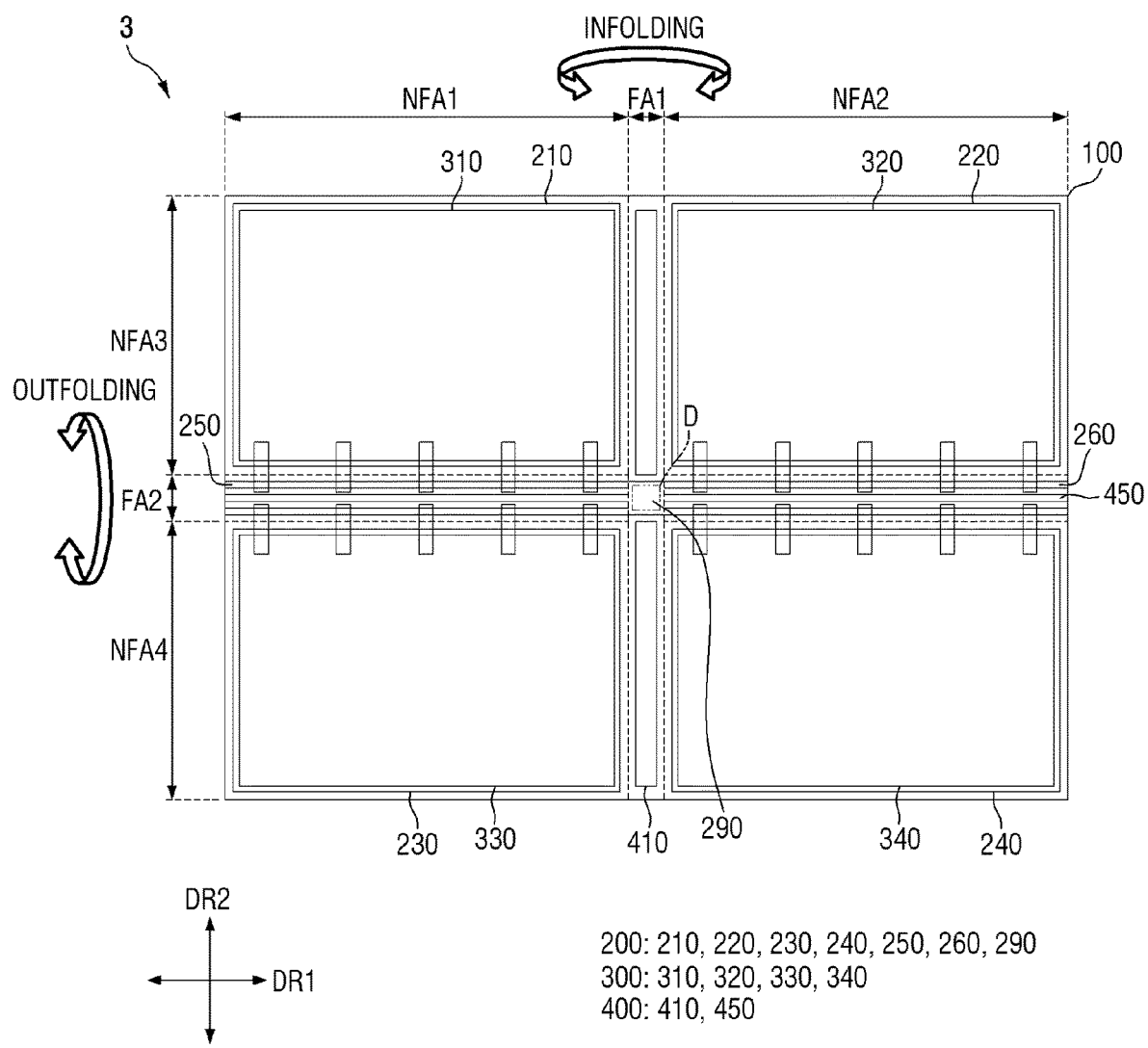
FIG. 18 is a schematic plan view of a display device according to still another embodiment.
Figure 19:
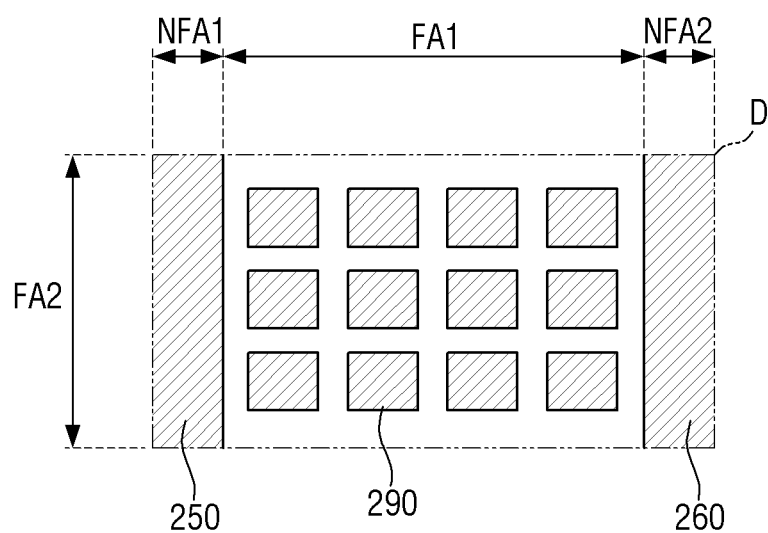
FIG. 19 is a schematic enlarged plan view of area D of FIG. 18.

FIG. 18 is a schematic plan view of a display device according to still another embodiment. FIG. 19 is a schematic enlarged plan view of area D of FIG. 18.

Referring to FIGS. 18 and 19, a display device 3 according to the embodiment may be different from the display device 1 of FIGS. 1 to 9 at least in that the display device 3 further includes a ninth metal plate 290 disposed in an overlapping area of the first folding area FA1 and the second folding area FA2.

Specifically, the display device 3 according to the embodiment may further include the ninth metal plate 290 disposed in the overlapping area of the first folding area FA1 and the second folding area FA2.

The ninth metal plate 290 may include patterns as shown in FIG. 19. The patterns of the ninth metal plate 290 may be disposed to be spaced apart from each other. The patterns of the ninth metal plate 290 may be arranged in a matrix in the first direction DR1 and the second direction DR2.

However, the disclosure is not limited thereto, and the patterns of the ninth metal plate 290 may be arranged in various ways.

The display device 3 according to the embodiment may further include the ninth metal plate 290, and the display module 100 may be more effectively supported in the overlapping area of the first folding area FA1 and the second folding area FA2. Accordingly, it is possible to prevent sagging of the display module 100 in the overlapping area of the first folding area FA1 and the second folding area FA2.

In this embodiment, when the display device 3 switches to the second operation state, the other surface of the display module 100 may be subjected to compressive stress, and the display surface of the display module 100 may be subjected to tensile stress. If the compressive stress is applied to the other surface of the display module 100 when the display device 3 switches to the second operation state, the length of the other surface of the display module 100 adjacent to the second joint parts 455 may tend to be shortened. If the second joint parts 455 are connected to the adjacent first and third main plates 310 and 330, the length of the other surface of the display module 100 may be maintained despite the tendency that the length of the other surface of the display module 100 becomes shortened. Therefore, waviness may occur on the other surface of the display module 100. This may be visually recognized by the user and may cause a screen defect.

In order to prevent the waviness caused by the compressive stress applied to the other surface of the display module 100 when the display device 3 switches to the second operation state, it may be considered that the first and third main plates 310 and 330 and the second joint parts 455 are disconnected to allow the second joint parts 455 to be further moved into the first and third main plates 310 and 330.

In other words, when the display device 3 according to an embodiment switches to the second operation state, the first and third main plates 310 and 330 and the second joint parts 455 may be disconnected such that the second joint parts 455 are further moved into the first and third main plates 310 and 330, thereby preventing the waviness from occurring on the other surface of the display module 100.

Although embodiments of the disclosure have been disclosed for illustrative purposes, those skilled in the art will appreciate that various modifications, additions and substitutions are possible, without departing from the scope and spirit of the claimed invention as defined in the accompanying claims.

What is claimed is:

1. A display device comprising:
   a display module including:
      a first folding area extending in a first direction;
      a first non-folding area located on a first side of the first folding area in a second direction intersecting the first direction;
      a second non-folding area located on a second side of the first folding area in the second direction;
      a second folding area extending in the second direction;
      a third non-folding area located on a first side of the second folding area in the first direction; and
      a fourth non-folding area located on a second side of the second folding area in the first direction,
   a first gear unit disposed in the second folding area; and
   a second gear unit disposed in the first folding area,
      wherein
   the display module includes a first surface and a second surface opposite to the first surface, the first surface being a display surface,
   one of the first and second gear units performs in-folding, and the other of the first and second gear units performs out-folding, and
   in an out-folding operation state, the display device is folded with respect to the second folding area such that the second surface in the third non-folding area and the second surface in the fourth non-folding area face each other.

2. The display device of claim 1, further comprising a metal plate disposed on the second surface of the display module.

3. The display device of claim 2, wherein in an in-folding operation state, the display device is folded with respect to the first folding area such that the first surface in the first non-folding area and the first surface in the second non-folding area face each other.

4. The display device of claim 3, wherein
   the metal plate includes:
      a first metal plate disposed in an overlapping manner in the first non-folding area and the third non-folding area;
      a second metal plate disposed in an overlapping manner in the second non-folding area and the third non-folding area;
      a third metal plate disposed in an overlapping manner in the first non-folding area and the fourth non-folding area; and
      a fourth metal plate disposed in an overlapping manner in the second non-folding area and the fourth non-folding area, and
   each of the first metal plate to the fourth metal plate has a whole pattern.

5. The display device of claim 4, wherein the metal plate includes:
   a fifth metal plate disposed in the second folding area and disposed between the third non-folding area and the fourth non-folding area in the first non-folding area; and
   a sixth metal plate disposed between the third non-folding area and the fourth non-folding area in the second non-folding area.

6. The display device of claim 5, wherein each of the fifth metal plate and the sixth metal plate includes a plurality of first patterns extending in the second direction and arranged in the first direction.

7. The display device of claim 6, wherein each of the fifth metal plate and the sixth metal plate is not disposed in the first folding area.

8. The display device of claim 7, wherein
the metal plate includes a seventh metal plate disposed in an intersection region of the first folding area and the second folding area, and
the seventh metal plate includes a plurality of second patterns separated from the first to sixth metal plates adjacent thereto.

9. The display device of claim 7, wherein the metal plate includes a seventh metal plate disposed in a portion of the first folding area which does not overlap the second folding area, the seventh metal plate including a plurality of third patterns.

10. The display device of claim 3, further comprising a main plate disposed under the metal plate,
wherein the main plate includes:
a first main plate disposed in an overlapping manner in the first non-folding area and the third non-folding area;
a second main plate disposed in an overlapping manner in the second non-folding area and the third non-folding area;
a third main plate disposed in an overlapping manner in the first non-folding area and the fourth non-folding area; and
a fourth main plate disposed in an overlapping manner in the second non-folding area and the fourth non-folding area.

11. The display device of claim 10, wherein
the first gear unit disposed in a portion of the second folding area which does not overlap the first folding area,
wherein the first gear unit includes an extension part extending in the second direction, and at least one joint part extending in the first direction from the extension part.

12. The display device of claim 11, wherein
the at least one joint part includes a plurality of joint parts, and
the plurality of joint parts are disposed in the main plate and overlaps the main plate.

13. The display device of claim 12, wherein an overlap length of the main plate and the at least one joint part in an unfolded state of the display device is less than an overlap length of the main plate and the at least one joint part in the out-folding operation state of the display device.

14. The display device of claim 13,
wherein the second gear unit is used to perform an in-folding operation of the display device.

15. The display device of claim 11, wherein
the first gear unit is used to perform an out-folding operation of the display device, and
the first and second gear units have foldable structure different from each other.

16. A display device capable of an in-folding operation and an out-folding operation, comprising:
a display module including:
a first folding area extending in a first direction;
a first non-folding area located on a first side of the first folding area in a second direction crossing the first direction;
a second non-folding area located on a second side of the first folding area in the second direction;
a second folding area extending in the second direction;
a third non-folding area located on a first side of the second folding area in the first direction;
a fourth non-folding area located on a second side of the second folding area in the first direction;
a first surface and a second surface opposite to the first surface, the first surface being a display surface; and
a metal plate disposed on the second surface of the display module;
a first gear unit disposed in the second folding area; and
a second gear unit disposed in the first folding area, wherein
one of the first folding area and the second folding area is a folding area for the in-folding operation,
the other one of the first folding area and the second folding area is a folding area for the out-folding operation,
one of the first and second gear units performs in-folding, and the other of the first and second gear units performs out-folding, and
the metal plate is disposed in one of the first folding area and the second folding area and is not disposed in the other one of the first folding area and the second folding area.

17. The display device of claim 16, wherein
the first folding area is a folding area for the in-folding operation,
the second folding area is a folding area for the out-folding operation,
the first surface in each of the first and second non-folding areas faces each other with respect to the first folding area, and
the second surface in each of the third and fourth non-folding areas faces each other with respect to the second folding area.

18. The display device of claim 17, wherein
the metal plate includes:
a first metal plate disposed in the second folding area and disposed between the third non-folding area and the fourth non-folding area in the first non-folding area; and
a second metal plate disposed between the third non-folding area and the fourth non-folding area in the second non-folding area, and
each of the first and second metal plates includes a plurality of patterns extending in the second direction and arranged in the first direction.

19. The display device of claim 18,
wherein the first gear unit for the out-folding operation includes:
an extension part extending in the second direction; and
a joint part extending in the first direction from the extension part.

20. The display device of claim 19, wherein
a cross-sectional shape of the joint part includes a circle having a predetermined curvature, and
the display device is out-folded according to the curvature of the joint part.

* * * * *